United States Patent
Bureau et al.

(10) Patent No.: US 9,145,146 B2
(45) Date of Patent: Sep. 29, 2015

(54) VEHICLE AND METHOD OF CONTROL THEREOF

(75) Inventors: Baptiste Bureau, Coventry (GB); Ajay-Neil Kemwal, Leamington Spa (GB); Keith Adam Leatherland, Coventry (GB); Robert Palin, Elmesthorpe (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/004,932

(22) PCT Filed: Mar. 14, 2012

(86) PCT No.: PCT/EP2012/054446
§ 371 (c)(1),
(2), (4) Date: Dec. 30, 2014

(87) PCT Pub. No.: WO2012/123486
PCT Pub. Date: Sep. 20, 2012

(65) Prior Publication Data
US 2015/0151766 A1 Jun. 4, 2015

(30) Foreign Application Priority Data
Mar. 15, 2011 (GB) .................................. 1104336.1

(51) Int. Cl.
*B60G 17/018* (2006.01)
*B60W 50/08* (2012.01)
(Continued)

(52) U.S. Cl.
CPC ............. *B60W 50/082* (2013.01); *B60W 10/04* (2013.01); *B60W 10/10* (2013.01); *B60W 10/22* (2013.01); *B60W 20/00* (2013.01); *Y10S 903/903* (2013.01); *Y10S 903/93* (2013.01)

(58) Field of Classification Search
CPC ........ B60W 20/00; B60W 20/10; B60K 6/48; B60K 25/00; Y02T 10/6221
USPC ..................... 701/22, 36, 37; 180/65.21, 165; 417/223; 903/903
See application file for complete search history.

(56) References Cited

U.S. PATENT DOCUMENTS 4,306,467 A * 12/1981 Pollman ........................... 475/81
5,463,599 A * 10/1995 Yifrach et al. .................... 369/7
(Continued)

FOREIGN PATENT DOCUMENTS

DE 10253809 A1 5/2004
DE 102009037856 A1 2/2011
(Continued)

OTHER PUBLICATIONS

International Search Report for PCT/EP2012/054446 dated Jun. 4, 2012, 7 pages.

*Primary Examiner* — Gertrude Arthur Jeanglaud
(74) *Attorney, Agent, or Firm* — Reising Ethington P.C.

(57) ABSTRACT

The present invention provides a motor vehicle having driver-selectable first and second modes (eco, dynamic) of operation and driver-operable means for selecting the first and second modes. Driver selection of the second mode (dynamic) when the first mode (eco) has also been selected causes the vehicle to deselect the first mode (eco), subsequent deselection by the driver of the second mode (dynamic) causing the first mode (eco) to be reselected automatically by the vehicle. If the first mode (eco) is selected by the driver when the vehicle is in the second mode (dynamic), the vehicle selects the first mode (eco) in addition to the second mode (dynamic). A further aspect is directed to a method.

20 Claims, 5 Drawing Sheets (51) Int. Cl.
  *B60W 10/10* (2012.01)
  *B60W 10/22* (2006.01)
  *B60W 10/04* (2006.01)
  *B60W 20/00* (2006.01)

(56) References Cited

U.S. PATENT DOCUMENTS 5,708,201 A * 1/1998 Kaub .................... 73/114.42
5,877,680 A * 3/1999 Okuchi et al. ............ 340/468
5,931,757 A * 8/1999 Schmidt ...................... 475/2
2008/0288132 A1* 11/2008 King et al. ................. 701/22
2010/0161194 A1  6/2010 Turski et al.
2010/0280712 A1* 11/2010 Bowman ..................... 701/36

FOREIGN PATENT DOCUMENTS

| EP | 1355209 A1 | 10/2003 |
| FR | 2936450 A1 | 4/2010 |
| GB | 2473294 A | 3/2011 |

* cited by examiner

VEHICLE AND METHOD OF CONTROL THEREOF

FIELD OF THE INVENTION

The present invention relates to a vehicle and to a method of controlling a vehicle. In particular, but not exclusively, the invention relates to a vehicle having stop/start functionality in which an actuator may be automatically stopped and restarted during the course of a drivecycle. By drivecycle is meant a period during which a vehicle is used to undertake a journey, commencing when the driver initiates starting of the vehicle (or 'key on') and ending when the driver initiates shutdown of the vehicle (or 'key off').

BACKGROUND

It is known to provide a motor vehicle having stop/start functionality in which an engine of the vehicle is switched off to save fuel when conditions permit such as when the vehicle is held stationary with a driver-operated brake pedal depressed. The condition in which the vehicle is held stationary with the engine automatically switched off during a drivecycle is known as an 'eco-stop' condition.

When the driver releases the brake pedal the engine may be restarted and a transmission of the vehicle may be re-engaged. That is, under 'no fault' normal operating conditions, release of the brake pedal by the driver triggers the engine to be restarted, the driveline to be closed and torque to be transmitted to the drive wheels.

It is also known to provide a hybrid electric vehicle (HEV) having an engine and an electric motor. In a parallel-type HEV the engine may be used to provide motive power to the vehicle. The engine and electric motor may be maintained in a stopped condition when the vehicle is held stationary by the brake pedal (i.e. in the eco-stop condition) in order to reduce fuel consumption.

If the vehicle is operating in a parallel mode in which the engine provides drive torque to the wheels, when the driver releases the brake pedal the vehicle may be arranged to restart the engine and re-engage the transmission. Alternatively, if the vehicle is operating in electric vehicle (EV) mode in which the electric motor is used to drive the vehicle and not the engine, if the vehicle is in the eco-stop condition (in which the electric motor is switched off when the vehicle is stationary) the vehicle may be arranged automatically to restart the electric machine when the brake pedal is released.

It is against this background that the present invention has been conceived. Embodiments of the invention may provide a vehicle or a method which improves upon known systems. Other aims and advantages of the invention will become apparent from the following description, claims and drawings.

STATEMENT OF THE INVENTION

In a first aspect of the invention there is provided a motor vehicle having an engine, driver-selectable first and second modes of operation and driver-operable means for selecting the first and second modes, when the first mode is assumed the vehicle being operable to implement a stop/start functionality in which the engine is stopped automatically and subsequently restarted during a drivecycle thereby to reduce an amount of time for which the engine is switched on over the drivecycle, when the second mode is assumed the vehicle being arranged to change a value of at least one operating parameter of the vehicle relative to vehicle operation when the vehicle is not in the second mode, the vehicle being operable such that at least one of:

driver selection of the second mode when the first mode has also been selected causes the vehicle to deselect the first mode;

subsequent deselection by the driver of the second mode causes the first mode to be reselected automatically by the vehicle; and the vehicle is operable to assume the first mode in addition to the second mode if the first mode is selected by the driver when the vehicle is in the second mode.

The term "engine" used herein is not intended to be limiting, unless otherwise indicated, and includes, by way of non-limiting example, any suitable prime mover or drive device such as a combustion engine, turbine or electric machine.

The feature that the first and second modes may both be selected has the advantage that the driver may enjoy the stop/start functionality (and therefore the benefit of improved fuel economy and/or a reduction in an amount of one or more gases emitted by the engine over a given drive cycle) whilst in the second mode.

The second mode may correspond to a 'dynamic' or 'sports' mode in which the one or more vehicle operating parameters are changed so as to improve at least one performance characteristic of the vehicle such as a time taken to accelerate from rest to a given speed.

Alternatively or in addition the second mode may correspond to a mode in which a selected one of a plurality of special vehicle programs are executed. The special vehicle programs may be arranged to control the vehicle according to a methodology, protocol or the like in order to optimise vehicle performance in a given situation. For example one program may optimise vehicle operating parameters for off-road driving, another may optimise vehicle parameters for driving at high speeds whilst turning, another may optimise vehicle parameters for driving on an icy surface, another may correspond to a dynamic or sports mode, and so forth.

In an embodiment, if the first mode is selected whilst the vehicle is in the second mode the vehicle remains in the first mode when the driver subsequently deselects the second mode.

In an embodiment, if the first mode is selected by the driver when the vehicle is in the second mode, the vehicle remains in the first mode when the driver subsequently deselects and reselects the second mode.

Optionally the vehicle is operable wherein if the second mode is deselected by the driver the vehicle assumes the first mode regardless of whether or not the vehicle was in first mode when the second mode was deselected.

The vehicle may be operable wherein if the second mode is deselected by the driver the vehicle assumes the first mode regardless of whether or not the vehicle is in first mode when the second mode is deselected provided the vehicle was in the first mode when second mode was last selected.

In an embodiment, if the second mode is driver selected when the vehicle is not in the first mode, subsequent driver deselection of the second mode results in automatic cancellation of the first mode if the first mode is driver selected whilst in the second mode.

Optionally if the vehicle is in the second mode and not the first mode and first mode is selected by the driver, the vehicle remains in the first mode if the second mode is subsequently deselected.

In an embodiment, if the vehicle is in the second mode and not the first mode and the first mode is selected by the driver, the vehicle remains in the first mode if the second mode is subsequently deselected provided the vehicle was in the first mode when the second mode was selected.

In an embodiment the vehicle may be arranged wherein if the vehicle is in the second mode and not the first mode, driver deselection of the second mode results in the first mode remaining deselected by the vehicle.

Optionally if the vehicle is in the second mode and not the first mode, driver deselection of the second mode results in the first mode remaining deselected by the vehicle provided first mode was deselected when the vehicle was not in second mode.

Figure 2:
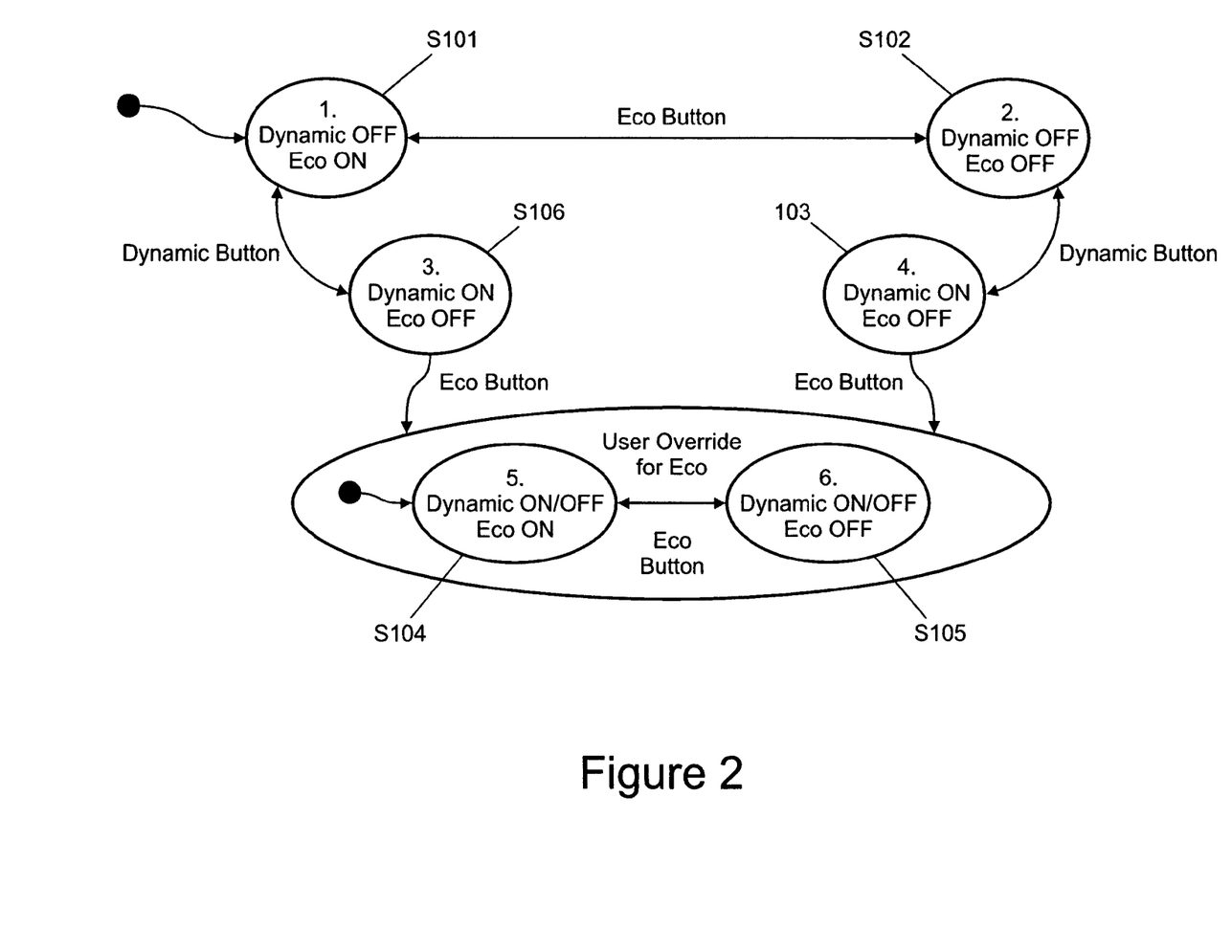
FIG. 2 is a state diagram showing states of the vehicle of FIG. 1 in respect of selection or deselection of an eco mode and a dynamic mode and a required driver control action to transition between the states.

Optionally if the first mode is selected when the vehicle is in the second mode, the vehicle is arranged to assume an override state in which driver selection and deselection of second mode does not cause the vehicle automatically to exit the first mode (FIG. 2 only).

In an embodiment when in the override state driver selection and deselection of the first mode does not cause the vehicle automatically to exit the second mode.

Optionally the stop/start functionality is implemented by means of a stop/start control methodology in which the engine is switched off when the vehicle is stationary.

In an embodiment in the first mode a throttle map and/or a gear change map are changed relative to operation not in the first mode in addition to stop/start functionality thereby to reduce an amount of fuel consumed by the vehicle over a given drivecycle.

Thus in some arrangements the first mode is a mode in which one or more operational aspects of the vehicle are optimised for fuel economy and engine emissions, for example throttle maps and/or gear change (or 'gear shift') maps.

Optionally when in the second mode the vehicle is arranged to change a value of at least one operating parameter such that an engine speed at which a gearbox is arranged to execute an upshift is increased relative to operation when not in the second mode.

In an embodiment, in the second mode the vehicle is arranged to change a value of at least one operating parameter such that a speed assumed by the engine for a given amount of throttle control actuation is increased relative to operation in non-second mode.

Thus, a target engine speed of the vehicle for a given amount of throttle depression is increased when operating in the second mode.

In an embodiment, when in the second mode the vehicle is arranged to change a value of at least one operating parameter such that a stiffness of a suspension of the vehicle is increased.

The stiffness of the suspension may be increased for example by reducing a size of an aperture in a damper of the suspension. Alternatively or in addition a portion of the suspension may comprise a material or fluid the stiffness of which may be changed by changing a value of an electric or electromagnetic field applied to the material or fluid. Other arrangements are also useful.

In a further aspect of the invention there is provided a method of controlling by means of control means a motor vehicle having an engine, driver-selectable first and second modes of operation and driver-operable means for selecting the first and second modes, when the first mode is assumed the method comprising implementing a stop/start functionality in which the engine is stopped automatically and subsequently restarted during a drivecycle thereby to reduce an amount of time for which the engine is switched on over the drivecycle, when the second mode is assumed the method comprising changing a value of at least one operating parameter of the vehicle relative to vehicle operation when the vehicle is not in the second mode, when the first mode has also been selected and the driver selects the second mode the method comprising controlling the vehicle to deselect the first mode, when the driver subsequent deselects the second mode the method comprising reselecting automatically the first mode, the method further comprising when in the second mode assuming the first mode in addition to the second mode if the first mode is selected by the driver when the vehicle is in the second mode.

In an embodiment, when in the second mode and the first mode is selected whilst in the second mode, the method comprises the step of remaining in the first mode when the driver subsequently deselects the second mode.

The method may further comprise the step of controlling the vehicle to remain in the first mode if the driver selects the first mode when the vehicle is in the second mode and the driver subsequently deselects and reselects the second mode.

In one aspect of the invention there is provided a method of controlling by means of a controller a vehicle having driver-selectable eco and dynamic modes of operation and driver-operable means for selecting the eco and dynamic modes, the method comprising the step of deselecting automatically by means of the controller the eco mode when the driver selects the dynamic mode when the eco mode has also been selected, and reselecting automatically the eco mode by means of the controller if the driver subsequently deselects the dynamic mode.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
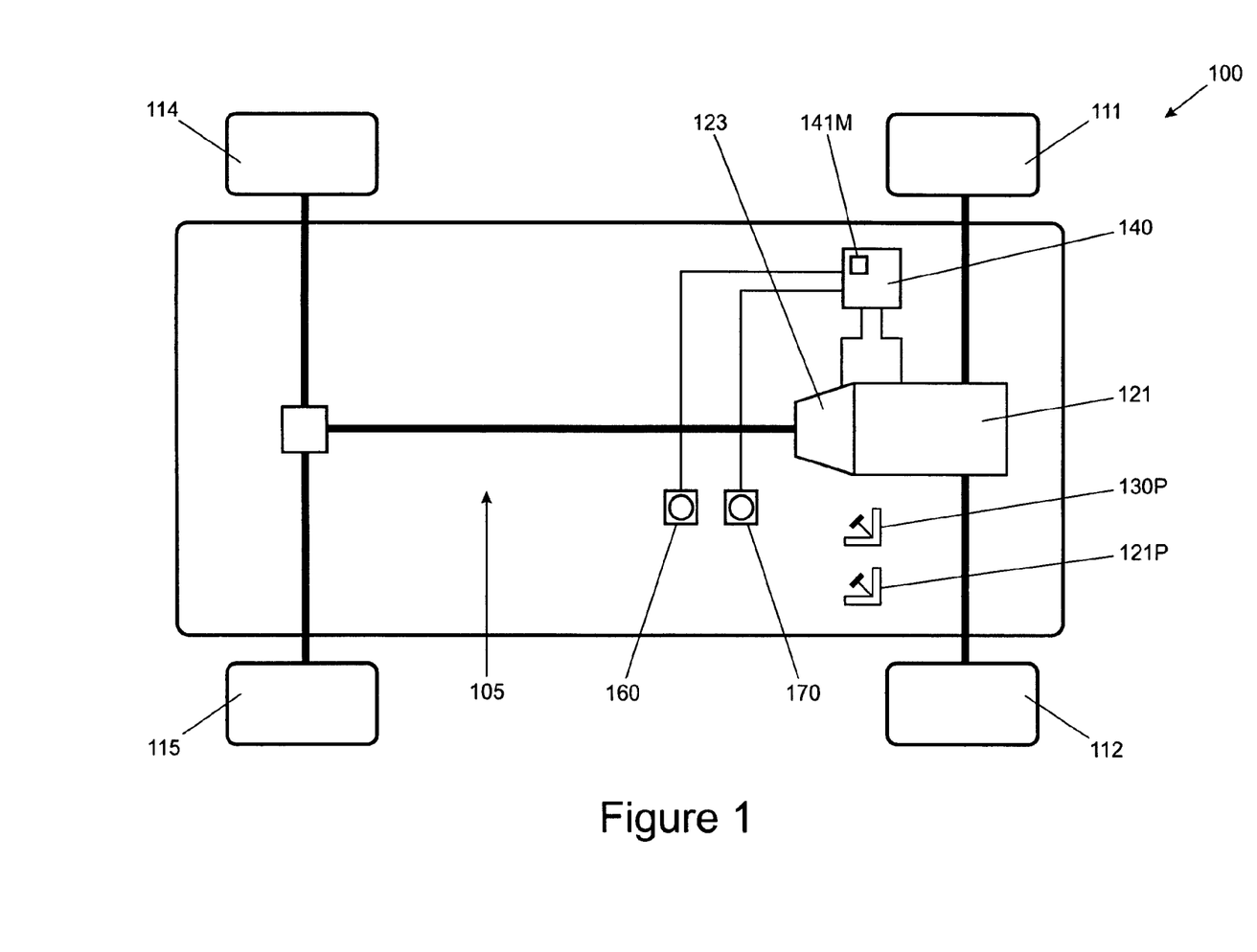
FIG. 1 is a schematic illustration of a stop/start vehicle according to an embodiment of the present invention.

FIG. 1 is a schematic illustration of a vehicle 100 according to an embodiment of the present invention.

The vehicle 100 has an internal combustion engine 121 arranged to provide torque to a driveline 5 of the vehicle by means of a transmission 123. The driveline 5 is arranged to drive four wheels 111, 112, 114, 115 of the vehicle 100.

In some embodiments the driveline 5 may be arranged to drive only two wheels of the vehicle. In some embodiments the driveline 5 may be operable to drive either two or four wheels of the vehicle. Other numbers of wheels are also useful.

The vehicle 100 has a controller 140 arranged to control a speed of the engine 121 responsive to an input from a throttle pedal control 121P.

The vehicle 100 is also provided with a pair of driver operated mode selectors. A first (eco mode) selector 160 is operable to select and to deselect an eco mode of operation whilst a second (dynamic mode) selector 170 is operable to select and to deselect a dynamic mode of operation. It is to be understood that the vehicle is operable in either or both of the eco and dynamic modes.

It is to be understood that the eco mode corresponds to a mode in which the vehicle operates according to a stop/start control methodology. That is, when the vehicle is held stationary by means of a brake pedal control 130P the engine 121 is stopped thereby to reduce fuel consumption and/or an amount of undesirable gases emitted by the vehicle 100.

In some embodiments the dynamic mode corresponds to a mode in which a gear shift map of the vehicle 100 is modified, for example by increasing the engine speed at which the transmission 123 of the vehicle 100 performs an upshift, i.e. a shift to a gear that is higher than the gear in which the vehicle 100 is currently operating, when operating in one or more gears.

In some embodiments a throttle map may also be modified, for example to cause the engine 121 to rotate at a higher speed for a given amount of throttle pedal depression.

Other arrangements are also useful. For example, other changes to one or more maps or other operating parameters of the vehicle are also useful.

It is to be understood that in vehicles not employing a map for one or more functions an alternative change may be made in order to achieve a similar change in performance of the vehicle.

Operation of the vehicle 100 will now be described with respect to selection and deselection of the eco mode (by the driver or the controller 140) and of the dynamic mode (by the driver).

FIG. 2 is a state flow diagram of a vehicle according to an embodiment of the invention. It is to be understood that the vehicle of FIG. 1 may be arranged to operate according to the state diagram of FIG. 2.

The description will begin from a default state of the vehicle (state S101) in which the dynamic mode is not selected (i.e. the dynamic mode is OFF) and the eco mode is selected (i.e. the eco mode is ON).

If whilst in the default state S101 the driver deselects the eco mode by pressing the eco mode selector 160 the vehicle is arranged to transition to state S102 in which the dynamic mode is OFF and the eco mode is OFF. If the driver subsequently selects the eco mode the vehicle returns to state S101 in which the eco mode is ON and the dynamic mode is OFF.

If whilst in state S102 the driver presses the dynamic mode selector 170 the vehicle transitions to state S103 in which the dynamic mode is ON and the eco mode is OFF. If the driver then deselects the dynamic mode, the vehicle transitions back to state S102 in which the dynamic mode and eco mode are both OFF.

If whilst in state S103 the driver selects the eco mode, the vehicle assumes state S104 in which the eco mode and dynamic mode are both ON. The vehicle also assumes an override condition in which condition deselection and selection of either the eco mode or the dynamic mode in any possible sequence has no effect on whether the other mode is selected or deselected.

Thus, for example, if whilst in state S104 the driver deselects eco mode (i.e. turns eco mode OFF), the vehicle assumes state S105 in which the dynamic mode remains ON and the eco mode is switched OFF.

Likewise, if whilst in state S104 the driver deselects dynamic mode the vehicle assumes a state in which the dynamic mode is OFF and the eco mode is ON.

If whilst in state S101 the driver selects the dynamic mode, the vehicle is arranged to transition to state S106 in which the dynamic mode is ON and the eco mode is OFF. That is, when the dynamic mode is selected the vehicle automatically deselects the eco mode. Eco mode is automatically deselected on the basis that a driver selecting dynamic mode is likely to be requiring relatively rapid response to control inputs and less likely to want the engine to turn off when the vehicle is stationary, for example when waiting at traffic lights.

If the driver subsequently deselects the dynamic mode, the vehicle 100 is arranged automatically to select eco mode and the vehicle 100 assumes state S101 of FIG. 2. Eco mode is resumed on the basis that the driver did not deselect eco mode prior to selecting the dynamic mode.

If whilst in state S106 the driver selects the eco mode, the vehicle 100 is arranged to assume state S104 in which the eco mode and dynamic modes are both selected.

As noted above, once the vehicle 100 enters state S104 in which eco mode is selected whilst in dynamic mode, the vehicle 100 assumes the override condition in which condition the deselection and selection of either the eco mode or the dynamic mode in any possible sequence has no effect on whether the other mode is selected or deselected. That is, the vehicle does not automatically select or deselect one mode responsive to the selection or deselection of another mode.

This feature has the advantage that if whilst in dynamic mode the drive selects the eco mode, the vehicle remains in eco mode until the driver deselects eco mode, regardless of how many times the driver deselects of selects dynamic mode.

In some embodiments arranged according to the state diagram of FIG. 2 the vehicle 100 is arranged to remain in the override condition until the engine 121 is shut down by the driver (and not shut down by the vehicle 100 according to the stop/start functionality).

It is to be understood that in the arrangement of FIG. 2, when the vehicle transitions from state S101 to state S106 the fact that eco mode is selected when in state S101 is stored in an eco status memory 141M of the vehicle. If the vehicle subsequently transitions back to state S101 from state S106 the vehicle recalls from the eco status memory 141M the stored status of eco mode (i.e. whether selected or deselected).

Similarly, when the vehicle transitions from state S102 to state S103, the fact that eco mode is deselected when in state S102 is stored in the eco status memory 141M for later recall if the vehicle transitions back to state S102 from state S103.

Thus it is to be understood that the vehicle is able to distinguish between states S106 and S103 (in both of which the dynamic mode is selected and the eco mode is deselected) by reference to the eco status memory 141M. In the present embodiment the eco status memory 141M is a flash memory although other memory devices are also useful.

Figure 3:
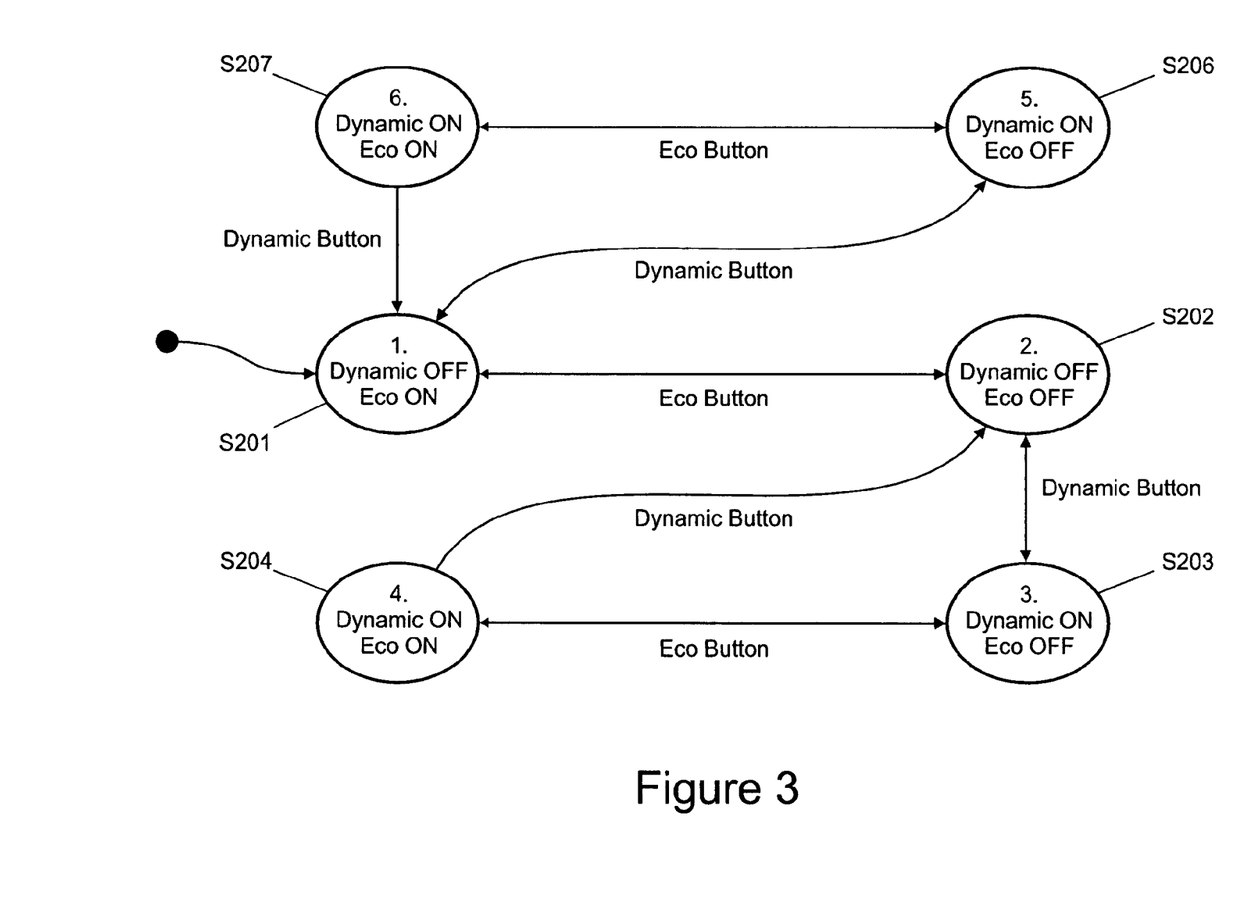
FIG. 3 is a state diagram showing states of a vehicle in respect of selection or deselection of the eco mode and the dynamic mode and a required driver control action to transition between the states according to a further embodiment of the invention.

FIG. 3 is a state diagram of the operation of a vehicle as shown in FIG. 1 according to a further embodiment of the invention.

The description will begin from a default state of the vehicle (state S201) in which the dynamic mode is not selected (i.e. the dynamic mode is OFF) and the eco mode is selected (i.e. the eco mode is ON).

If whilst in state S201 the driver deselects the eco mode, the vehicle assumes state S202 in which the dynamic mode and eco mode are both OFF. If whilst in state S202 the driver selects the dynamic mode the vehicle transitions to state S203 in which the dynamic mode is ON and the eco mode is OFF. This is similar to the arrangement of FIG. 2.

If the driver subsequently selects the eco mode the vehicle transitions to state S204 in which the dynamic mode and eco mode are both ON.

If the driver subsequently deselects the eco mode the vehicle returns to state S203.

However if whilst in state S204 the driver deselects dynamic mode, the vehicle returns to state S202 in which the dynamic mode and eco mode are both OFF. That is, deselection of dynamic mode by the driver also results in automatic deselection of eco mode by the vehicle.

The advantage of this feature is that the vehicle returns to the state it was in prior to selection by the driver of dynamic mode.

The fact that the driver deselected eco mode whilst not in dynamic mode suggests the driver does not desire eco functionality on the journey and therefore the vehicle transitions from state S204 to state S202 rather than to state S201.

Thus, a driver wishing to transition from state S204 to state S202 can do so directly and does not have to assume state S202 via state S201 or state S203. This has the advantage that the workload of the driver in driving the vehicle according to his preferred style may be decreased.

It is to be understood that if the driver subsequently selects the dynamic mode from state S202, the dynamic mode is assumed without also assuming the eco mode (state S203).

If whilst in state S201 the driver selects dynamic mode rather than deselecting eco mode, the vehicle assumes state S206 in which dynamic mode is ON and eco mode is automatically deselected by the vehicle. Subsequent deselection of dynamic mode results in automatic reselection of eco mode by the vehicle.

The fact that the driver has not deselected eco mode whilst dynamic mode is not selected indicates that the driver most likely wishes to assume eco mode when not in dynamic mode.

If whilst in dynamic mode in state S206 the driver selects eco mode, the vehicle assumes state S207 in which eco mode and dynamic mode are both selected. If the driver subsequently deselects eco mode the vehicle returns to state S206 whilst if the driver deselects dynamic mode when in state S207 the vehicle returns to state S201.

Thus if the vehicle assumes the dynamic mode when eco mode has been selected, when dynamic mode is exited the vehicle returns to state S201 in which the eco mode is selected. Selection and/or deselection of eco mode whilst in dynamic mode therefore has no effect on whether eco mode is selected when the dynamic mode is subsequently deselected. Rather, the vehicle recalls the fact that eco mode was already selected when dynamic mode was last selected and returns to state S101 when dynamic mode is deselected.

It is to be understood that if the vehicle makes a transition from state S201 to state S206 the vehicle stores the status of the eco mode in the eco status memory 141M of the vehicle for later recall if the vehicle transitions back to state S201 from state S206 or from state S207 to state S201.

Similarly, if the vehicle transitions from state S202 to state S203 the vehicle stores the status of the eco mode in the eco status memory 141M for later recall when the vehicle transitions from state S203 back to state S202 or from state S204 back to state S202.

It is to be understood that the vehicle is able (by means of the eco status memory 141M) to distinguish between states S203 and S206 (in both of which dynamic mode is selected and eco mode is deselected) and between states S204 and S207 (in both of which dynamic mode and eco mode are both selected) by reference to the eco status memory 141M.

Figure 4:
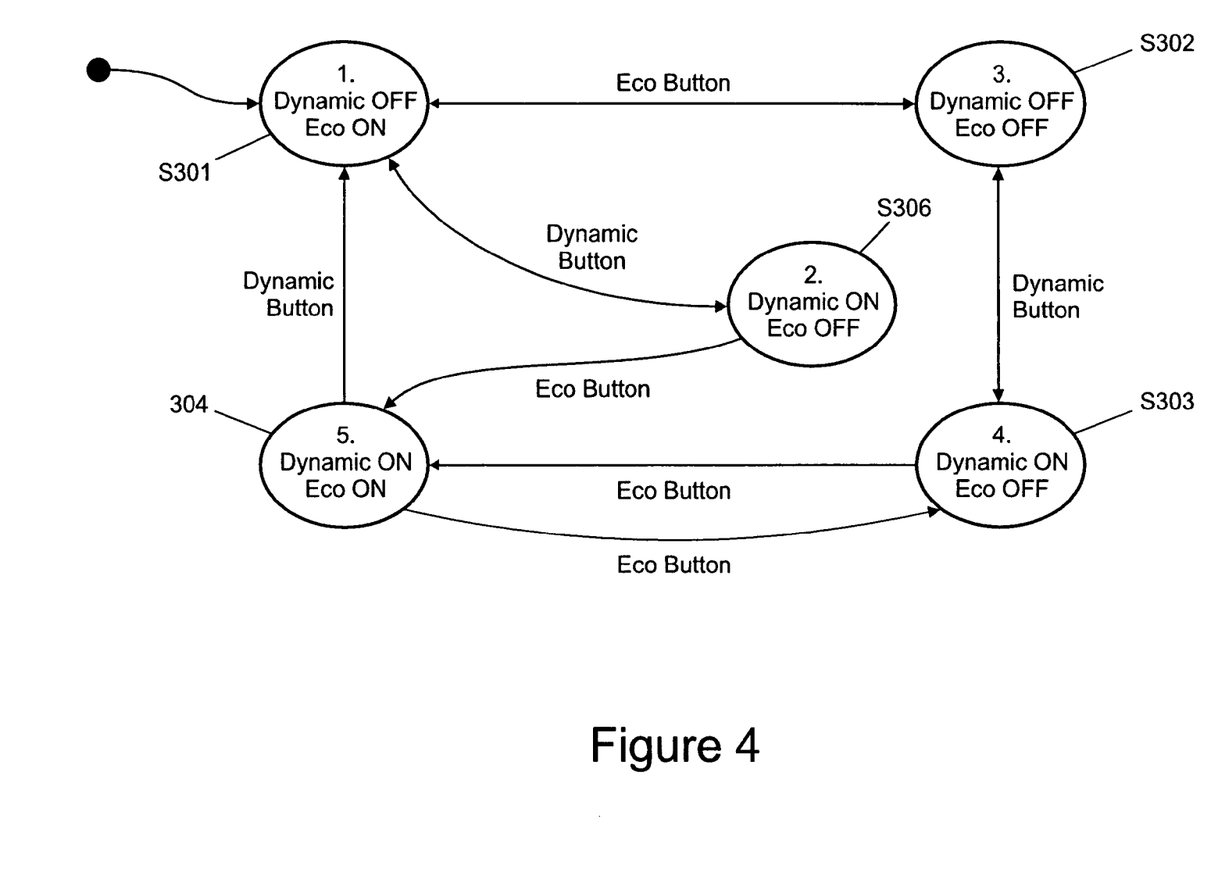
FIG. 4 is a state diagram showing states of a vehicle in respect of selection or deselection of the eco mode and the dynamic mode and a required driver control action to transition between the states according to a still further embodiment of the invention.

FIG. 4 is a state diagram of the vehicle 100 of FIG. 1 when operated according to a further embodiment of the invention.

The arrangement of FIG. 4 is similar to the arrangement of FIG. 3 and like states are provided with like reference signs prefixed numeral 3 instead of numeral 2.

The state transitions experienced by the vehicle 100 responsive to selection/deselection of the eco and dynamic modes are similar to those of FIG. 3 with certain differences.

Of note is that state S304 (in which dynamic mode and eco mode are both selected) only appears once on the state diagram whereas in the diagram of FIG. 3 it appears twice (S204 and S207).

Thus, in the arrangement of FIG. 4, if when dynamic mode and eco mode are both selected the dynamic mode is deselected, the vehicle always remains in the eco mode regardless of whether eco mode was selected when dynamic mode was last selected.

In contrast, in the arrangement of FIG. 3, if when dynamic mode and eco mode are both selected the dynamic mode is deselected, the state assumed by the vehicle depends on the order in which dynamic mode and eco mode were selected by the driver starting at default state S201.

Thus, in the arrangement of FIG. 4, the fact that the driver has selected eco mode whilst in dynamic mode is taken to indicate that the driver most likely wishes to remain in eco mode when dynamic mode is deselected.

Secondly, in state S303 in which the dynamic mode is ON and eco mode is OFF, if the dynamic mode is deselected the eco mode remains deselected regardless of the history of selection of eco mode and dynamic mode.

This is because in order to arrive at state S303 from default state S301, the driver is required to have deselected eco mode either when the dynamic mode was OFF or when dynamic mode was ON.

The fact that the driver has specifically deselected eco mode is taken to suggest the driver would not wish to return to eco mode when dynamic mode is deselected.

Thus, selection of dynamic mode when in eco mode and subsequent deselection of dynamic mode results in a return to eco mode unless eco mode is specifically deselected by the driver whilst in dynamic mode, in which case unless eco mode is specifically reselected whilst in dynamic mode, the eco mode remains deselected when dynamic mode is subsequently deselected.

It is to be understood that other arrangements are also useful.

In the arrangement of FIG. 4, it is to be understood that when the vehicle transitions from state S301 to state S306, the eco mode status is stored in the eco status memory 141M for later recall if the vehicle transitions back from state S306 to state S301.

Similarly, when the vehicle transitions from state S302 to state S303, the eco mode status is stored in the eco status memory 141M for later recall if the vehicle transitions back from state S303 to S302.

However, if the vehicle transitions from state S303 to state S304 by selecting the eco mode, if the dynamic mode is deselected whilst in state S304 the vehicle remains in the eco mode.

Thus, in some embodiments if the eco mode is selected when in state S303, the eco mode status stored in the eco status memory 141M is reversed such that if the dynamic mode is subsequently deselected whilst in state S304 the eco mode remains selected, Conversely, if whilst in state S304 the eco mode is deselected, in some embodiments the eco mode status stored in the eco status memory 141 is reversed such that if the dynamic mode is subsequently deselected whilst in state S303 the eco mode remains deselected.

As noted above, FIG. 5 is a state diagram showing states assumed by the vehicle according to each of the arrangements of FIG. 2 (arrangement 1, Arr, 1), FIG. 3 (arrangement 2, Arr, 2) and FIG. 4 (arrangement 3, Arr, 3) for a set of six example scenarios in which a driver makes a series of selections and deselections of the eco and dynamic modes.

Figure 5:
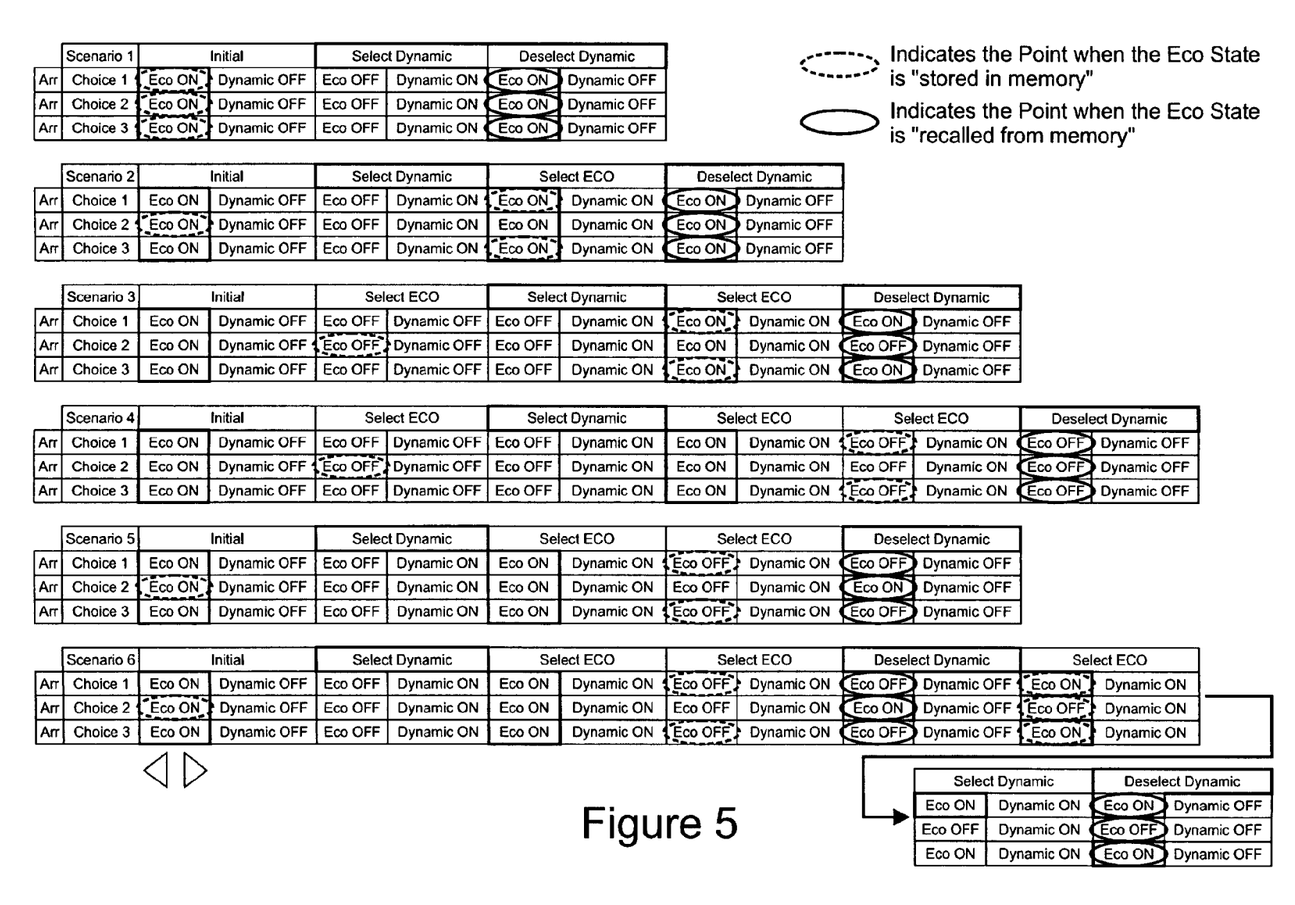
FIG. 5 is a state diagram showing states assumed by vehicles configured according to each of the arrangements of FIG. 2 (arrangement 1, Arr, 1), FIG. 3 (arrangement 2, Arr, 2) and FIG. 3 (arrangement 3, Arr, 3) for a set of six example scenarios.

In each case, the state circled with a dashed line is a state in which the eco mode is stored in the eco status memory 141M of the vehicle for later recall when the vehicle assumes the state circled by a solid line. That is, the eco mode assumed in the state circled with the dashed line is resumed in the state circled with a solid line.

It is to be understood that whilst some embodiments of the invention have been described wherein the vehicle is operable in an eco mode (or 'stop/start' mode) and a second mode (which may be a 'dynamic' or 'sports' mode), the second mode may in some embodiments correspond to a mode in which a selected one of a plurality of special vehicle programs are executed. The special vehicle programs may be arranged to control the vehicle according to a methodology, protocol or the like in order to optimise vehicle performance in a given situation. For example one program may optimise vehicle operating parameters for off-road driving, another may optimise vehicle parameters for driving at high speeds whilst turning, another may optimise vehicle parameters for driving on an icy surface and so forth.

Embodiments of the invention include hybrid electric vehicles, conventional stop/start vehicles and any other suitable type of motor vehicle.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle having a prime mover for providing motive power to the vehicle, driver-selectable first and second modes of operation and driver-operable selectors for selecting the first and second modes;

in the first mode the vehicle being operable to implement a stop/start functionality in which the prime mover is stopped automatically and subsequently restarted during a drivecycle thereby to reduce an amount of time for which the prime mover is switched on over the drivecycle; and in the second mode the vehicle being arranged to change a value of at least one operating parameter of the vehicle relative to vehicle operation when the vehicle is not in the second mode;

wherein the vehicle is arranged such that:

driver selection of the second mode when the vehicle is in the first mode causes the vehicle to deselect the first mode, subsequent deselection by the driver of the second mode causing the first mode to be reselected automatically by the vehicle; and driver selection of the first mode when the vehicle is in the second mode causes the vehicle to select the first mode in addition to the second mode.

2. A vehicle as claimed in claim 1 operable wherein if the first mode is selected while the vehicle is in the second mode the vehicle remains in the first mode when the driver subsequently deselects the second mode.

3. A vehicle as claimed in claim 1 wherein if the first mode is selected by the driver when the vehicle is in the second mode, the vehicle remains in the first mode when the driver subsequently deselects and reselects the second mode.

4. A vehicle as claimed in claim 1 wherein if the vehicle is in the second mode and not the first mode, driver deselection of the second mode results in the first mode remaining deselected by the vehicle provided the first mode was deselected when the vehicle was not in the second mode.

5. A vehicle as claimed in claim 1 operable wherein if the second mode is deselected by the driver the vehicle assumes the first mode regardless of whether or not the vehicle was in first mode when the second mode was deselected.

6. A vehicle as claimed in claim 1 operable wherein if the second mode is deselected by the driver the vehicle assumes the first mode regardless of whether or not the vehicle is in first mode when the second mode is deselected provided the vehicle was in the first mode when second mode was last selected.

7. A vehicle as claimed in claim 1 operable wherein if the second mode is driver selected when the vehicle is not in the first mode, subsequent driver deselection of the second mode results in automatic cancellation of the first mode if the first mode is driver selected while in the second mode.

8. A vehicle as claimed in claim 1 arranged wherein if the vehicle is in the second mode and not the first mode and the first mode is selected by the driver, the vehicle remains in the first mode if the second mode is subsequently deselected.

9. A vehicle as claimed in claim 1 operable wherein if the vehicle is in the second mode and not the first mode and first mode is selected by the driver, the vehicle remains in the first mode if the second mode is subsequently deselected provided the vehicle was in the first mode when the second mode was selected.

10. A vehicle as claimed in claim 8 arranged wherein if the vehicle is in the second mode and not the first mode, driver deselection of the second mode results in the first mode remaining deselected by the vehicle.

11. A vehicle as claimed in claim 1 wherein if the first mode is selected when the vehicle is in the second mode, the vehicle is arranged to assume an override state in which driver selection and deselection of the second mode does not cause the vehicle automatically to exit the first mode.

12. A vehicle as claimed in claim 11 wherein when in the override state driver selection and deselection of the first mode does not cause the vehicle automatically to exit the second mode.

13. A vehicle as claimed in claim 1 wherein the stop/start functionality is implemented by a stop/start control methodology in which the engine is switched off when the vehicle is stationary.

14. A vehicle as claimed in claim 1 wherein in the first mode a throttle map and/or a gear change map are changed relative to operation not in the first mode in addition to stop/start functionality thereby to reduce an amount of fuel consumed by the vehicle over a given drivecycle.

15. A vehicle as claimed in claim 1 wherein in the second mode the vehicle is arranged to change a value of at least one operating parameter such that an engine speed at which a gearbox is arranged to execute an upshift is increased relative to operation when not in the second mode.

16. A vehicle as claimed in claim 1 wherein in the second mode the vehicle is arranged to change a value of at least one operating parameter such that a speed assumed by the engine for a given amount of throttle control actuation is increased relative to operation when not in the second mode.

17. A vehicle as claimed in claim 1 wherein in the second mode the vehicle is arranged to change a value of at least one operating parameter such that a stiffness of a suspension of the vehicle is increased.

18. A method of controlling a motor vehicle having an engine, driver-selectable first and second modes of operation and driver-operable selectors for selecting the first and second modes, when the first mode is assumed the method comprising implementing a stop/start functionality in which the engine is stopped automatically and subsequently restarted during a drivecycle thereby to reduce an amount of time for which the engine is switched on over the drivecycle, when the second mode is assumed the method comprising changing a value of at least one operating parameter of the vehicle relative to vehicle operation when the vehicle is not in the second mode, when the first mode has been selected and the driver selects the second mode the method comprising controlling the vehicle to deselect the first mode, if the driver subsequently deselects the second mode the method comprising reselecting automatically the first mode, the method further comprising when in the second mode assuming the first mode in addition to the second mode if the first mode is selected by the driver when the vehicle is in the second mode.

19. A method as claimed in claim 18 whereby when in the second mode and the first mode is selected while in the second mode, the method comprises the step of remaining in the first mode when the driver subsequently deselects the second mode.

20. A method as claimed in claim 18 further comprising controlling the vehicle to remain in the first mode if the driver selects the first mode when the vehicle is in the second mode and the driver subsequently deselects and reselects the second mode.

* * * * *